United States Patent [19]
Damm et al.

[11] Patent Number: 5,645,386
[45] Date of Patent: Jul. 8, 1997

[54] FORCE FIT CONNECTING ELEMENT ESPECIALLY WHEEL STUD

[75] Inventors: Klaus Damm, Homberg/Ohm; Walter Mages, Alsfeld; Andreas Mohr, Antrifttal, all of Germany

[73] Assignee: Kamax-Werke Rudolf Kellermann GmbH & Co. KG, Osterode, Germany

[21] Appl. No.: 620,483

[22] Filed: Mar. 22, 1996

Related U.S. Application Data

[63] Continuation of Ser. No. 250,009, May 27, 1994, abandoned.

[30] Foreign Application Priority Data

Jun. 4, 1993 [DE] Germany ............... 43 18 494.4

[51] Int. Cl.⁶ .................................... F16B 35/04
[52] U.S. Cl. ................ 411/412; 411/411; 411/399; 411/508
[58] Field of Search ................ 411/399, 411, 411/412, 413, 508, 510; 403/285, 283

[56] References Cited

U.S. PATENT DOCUMENTS

| | | | |
|---|---|---|---|
| 2,895,368 | 7/1959 | Place | 411/399 |
| 3,418,012 | 12/1968 | Torre | 411/411 |
| 3,418,013 | 12/1968 | Kelly | 411/399 |
| 3,456,972 | 7/1969 | Drotar | 411/399 |
| 3,707,107 | 12/1972 | Bieri | 85/46 |
| 4,018,132 | 4/1977 | Abe | 411/413 |
| 4,576,534 | 3/1986 | Barth et al. | 411/412 |
| 4,653,244 | 3/1987 | Farrell | 411/399 |
| 4,820,098 | 4/1989 | Taubert et al. | 411/412 |
| 5,024,563 | 6/1991 | Randall | 411/412 |

FOREIGN PATENT DOCUMENTS

| | | |
|---|---|---|
| 0144503 | 6/1984 | European Pat. Off. |
| 1111029 | 10/1953 | France |
| 2143784 | 3/1973 | Germany |
| 3521755 | 4/1993 | Germany |
| 399980 | 4/1932 | United Kingdom |
| 1235143 | 7/1968 | United Kingdom |
| 8602416 | 4/1986 | WIPO |

*Primary Examiner*—Steven N. Meyers
*Assistant Examiner*—Tuyet-Phuong Pham
*Attorney, Agent, or Firm*—Thomas, Kayden, Horstemeyer & Risley

[57] ABSTRACT

A force fit connecting element (1), particularly a wheel stud, which may be force fit into in a drilled hole (3) through the exertion of an axial force, having a shank (5) and a stop (4) in the shape of a head, a collar or the like, having a diameter larger than shank (5). The shank (5) has on the side facing the stop (4) a force fit section (10), which is oversized with respect to the corresponding drilled hole (3). The shank (5) has on the side facing away from the stop (4) a section (22) with a fastening thread (23). The force fit section (10) has a multiple-threaded, preferably at least triple-threaded, helical profile (11). The helical profile (11), with respect to the cylindrical surface area of the drilled hole (3), has a contact area fraction (33) of at least 30% and is made by cold forming.

15 Claims, 6 Drawing Sheets

FORCE FIT CONNECTING ELEMENT ESPECIALLY WHEEL STUD

This is a continuation of application Ser. No. 08/250,009 filed on May 27, 1994, now abandoned.

FIELD OF THE INVENTION

This invention is related to a force fit connecting element, particularly a wheel stud, which may be force fit into a drill hole through the exertion of an axial force, having a shank and a stop in the shape of a head, a collar or the like having a larger diameter than the shank, where the side of the shank facing the stop a force fit section which has an overmeasure with respect to the corresponding drill hole, and on the side of the shank facing away from the stop a section with fastening thread. The force fit connecting element is fit into a drilled hole in the work piece in which it is to be used by a purely axial force. The force fit connecting element is not fit into the drilled hole by screwing. The invention is also not related to so called extension fit bolts which have an extension section that has an undermeasure with respect to the corresponding drilled hole in the work piece. In connection with the present invention, an extension function is not of primary importance, rather a fitting function via centering and clamping is.

BACKGROUND OF THE INVENTION

Force fit connecting elements of the type described above are known for instance as hexagon head fit bolts according to DIN 609. In a preferred application they are used as wheel studs. They then have a head that is often formed to be slanted on one side and which forms a stop in the fitting. The stop terminates the fitting process. Connected to the head is a shank with a comparatively smaller outer diameter, which has a force fit section on the side facing the head. The force fit section is formed to be a ground cylindrical surface. The force fit section is the thickest part of the shank, i.e. it has the largest outer diameter in the region of the shank. A relief groove is provided between the head and the shank. It is also possible to provide a transition radius at this position which necessitates a corresponding bevelling of the drill hole into which the force fit connecting element is fitted. The force fit section has an overmeasure, i.e., it is oversized, with respect to the corresponding drilled hole. Particularly in the case of wheel studs, a section with a fastening thread joins the force fit section on the shank, with the outer diameter of the fastening thread being smaller than the outer diameter of the force fit section. The slugs used in the production of such wheel studs have in the region of the shank a stepped outer diameter. In the region of the force fit section to be ground the largest diameter is provided, while in the region of the fastening thread to be formed a smaller diameter is used. A tapered transition section is provided in between these two sections.

These known force fit connecting elements have a number of disadvantages. In order to stay within the required tolerances in the region of the overmeasure, the force fit section has to be finished by a grinding process. This grinding process is, on the one hand, elaborate and requires the use of additional material which is ground off, on the other hand. In the transition region between the force fit section and the head a relief groove is necessary if the corresponding drill hole has no bezel. This relief groove is usually made by machining, which together with the grinding makes the production more expensive. Such force fit connecting elements not only have a relatively high weight, but also require a higher starting weight than the weight of the finished part. In the production of the connecting element stepped slugs have to be used, which require an additional work step as compared to slugs with a continuous diameter of the shank. During the axial fitting of the force fit connecting element into the corresponding drilled hole of the work piece, especially the hub of a wheel, the use of a joining aid becomes necessary, which ensures that the force fit connecting element is guided and aligned axially so that the axis of the drilled hole and the axis of the wheel stud is concentrically aligned. Still, there is the danger of material displacement during the fitting, since the force fit section is oversized with respect to the drilled hole. The force fit connecting element has no centering aid, since the tapered transition section of the slug with the stepped shank is covered by the usually rolled fastening thread. Occasionally a seizing is observed during the axial fitting. Such seizing effects, which may ultimately be overcome by the axial force, lead to permanent damage of the force fit connecting element as well as the corresponding work piece with the drilled hole, so that both pieces cannot be used again.

There are further force fit connecting elements known in the art whose force fit section does not consist of a ground cylindrical surface area, but in which the force fit section has knurls, i. e. protruding ribs or ridges, which are axially aligned on the surface of the force fit section. The axial alignment of the knurls, i.e. parallel to the axis of the force fit connecting element, is necessary in order to avoid any turning motion of the force fit connecting element during the axial fitting into the drilled hole. Next to the elaborate production of such force fit connecting elements a major disadvantage is that they are not reusable. The knurling furrows itself into the drilled hole during the axial fitting and is plastically deformed. When this occurs the knurling does not fulfill the necessary tolerances at its outer diameters and the force fit connecting element is not reusable. The drilled hole of the corresponding work piece is also plastically deformed by the furrows, so that the matching piece of the force fit connecting element is also not reusable. In contrast to this, force fit connecting elements of the generic type with force fit sections on a cylindrical surface area are reusable. Here the work piece with the drilled hole is also reusable, as long as no seizing effects occur during the fitting.

Furthermore, so-called extension fit bolts are known, however the present invention is not concerned with these. Extension fit bolts, as they are known from the DE-PS 35 21 755, DE-OS 21 43 784, and EP 0 144 503 B1, all have undermeasure, i.e., are undersized with respect to the drilled hole in the region of their extension fit section. Furthermore, such connecting elements serve to connect two parts to each other in which the object is to center the two drilled holes of the two parts with respect to each other. The extension fit section is freely movable in the drilled hole under a corresponding axial force. A turning of the extension fit bolt must not be hindered. Extension fit connecting elements are either screwed in or inserted and then secured by a nut. The known extension fit connecting elements have either a slim shaped shank or a helical profile or circumferential swellings or ribs in the region of the extension section. By this the necessary extension function is obtained in the region of the extension fit section. The centering function for the two parts to be connected to each other is also obtained by the extension fit section, through which there is always some clearance during the joining, though. Therefore extension fit connecting elements are fundamentally different from the generic force fit connecting elements.

SUMMARY OF THE INVENTION

It is the object of the invention to provide a force fit connecting element of the type described above, which can be manufactured less expensively than previously and has advantages in its handling, and which should generally be reusable.

According to the invention this is obtained with the force fit connecting element of the type described above in that the force fit section has a multiple-threaded, preferably at least triple-threaded, helical profile, that the helical profile, with respect to the cylindrical surface area of the drilled hole, has a contact area fraction of at least 30%, and that the helical profile is made by cold forming.

The invention is thus based on the idea of departing from the ground force fit section of the state of the art to provide the force fit section with a helical profile, i.e. with a tread-like design, at least concerning the pitch. Circumferential swellings or ribs as well as axial knurling may not be used, since both measures impair resusability. It is best when a triple-threaded helical profile is used. The three inlets of the helical profile are then spaced evenly around the circumference, and during the insertion of the force fit connecting element into the drilled hole of the corresponding work piece a three point contact is established by these three inlets, through which the force fit connecting element is aligned and centered with its axis perpendicular to the plane defined by the three inlets. The following axial force fitting happens deliberately in controlled fashion, without plastic material displacement occurring. During the use of triple-threaded helical profiles a joining aid is not needed in the fitting. When a double-threaded helical profile is used, though, the use of a joining aid is advisable.

The multiple-threaded helical profile in the region of the force fit section functions differently than the ground cylindrical surface area in the state of the art. The drilled hole is not wholly expanded radially, but the force fitting of the helical profile causes a partial line-shaped expansion in the elastic region. The drilled hole is elastically deformed radially line-shaped according to the helical profile. This causes a relaxation of the material surrounding the drilled hole in the spaces between the helixes of the helical profile when the force fitting is finished. Thus a certain positive lock between the force fit section and the drilled hole is created in an axial direction, which is effective in addition to the frictional lock of the contact area fraction. This relaxation is also due in part to the strength of the materials of the connecting element and the corresponding part. The material of the connecting element has a greater strength than the material of the corresponding part. Since the correspond part is softer than the connecting element, it is able to elastically deform in response to the insertion of the connecting element.

The force fit section should have a contact area fraction of at least 30%. This is the area on the outer diameter of the helical profile which is in contact with the inner wall of the drilled hole after the fitting. The percent value of the contact area fraction may also be related to the cylindrical surface area of the drilled hole, under the condition that the drilled hole and the force fit section have the same axial length. Instead, it would also be possible to relate the contact area fraction of the force fit section to a fictitious surface area of the force fit section itself. A contact area fraction of 30% in conjunction with the use of a multiple-threaded helical profile surprisingly is sufficient to realize similar holding forces as they are realized using ground cylindrical force fit sections. This is probably due to the additional positive lock in the elastic region.

Further advantages of the new force fit connecting element are also obtained by the less expensive lower costs of production compared to grinding in the state of the art.

Through the application of the helical profile by cold forming, i.e. by rolling, a material removing process step is replaced by a non material removing process step. This not only saves initial material weight, but through the cold forming of the helical profile a circumferential depression is created automatically and without further process steps on the side of the force fit section facing the stop, which has the function of the relief groove in the state of the art, so that on the other hand the drilled hole in the work piece does not require a bevelling. On the other side of the force fit section, i.e. in the direction of the free end of the shank, a centering aid through the ending of the helical profile is created by the cold forming. This is the case even when a slug with an unstepped shank diameter is used. By the special design of the helical profile in the cold forming it is possible to fashion the helical profile so that its outer diameter is larger than the outer diameter of the section with the fastening thread. Finally, it is advantageous that due to the comparatively reduced contact area fraction the chance of seizing during the fitting of the force fit connecting element is also reduced.

Preferably, the outer diameter of the helical profile is formed to be larger than the outer diameter of a cylindrical force fit section. In the state of the art the cylindrical force fit section, which is finished by grinding, is used. The ground outer surface area of the force fit section therefore is 100%. It has a corresponding overmeasure with respect to the drilled hole of the corresponding part and comes into contact with the inner surface of the drilled hole with 100% of its outer surface area in the fitted state. The new force fit connecting element, the outer diameter of which is defined by a helical profile, has a contact area fraction which is smaller than 100%, i.e. approximately in the region between 20 and 50%, especially 30 to 40%. A greater amount of overmeasure is used in the new force fit connecting element, which is fashioned in a way, though, that the resulting deformation is still in the elastic region, so that damage to the two parts with permanent deformations does not occur.

The helical profile preferably has a flank angle in the range of from 0° to 30°, most preferably approximately 15°. This is a very steep design of the flank, which has the aim to distribute the material in the region of the force fit section displaced by the cold forming to a larger diameter and to form the contact area fraction described above. The depth of the helical profile, i.e. the difference between the outer diameter and core diameter, does not have to be chosen to be very large. It is possible to design the depressions between the helixes of the helical profile correspondingly wide.

It is especially important that the outer diameter of the helical profile is defined by gauging, especially by milling, rolling or butt-joining. This happens after the shaping of the helical profile performed by cold forming. During this cold forming the outer diameter of the helix does not yet obtain a smooth axially parallel alignment. The outer diameter is gauged in an additional work step. This, too, is a non-cutting process step, which is suitable, though, to stay within close tolerances. This gauging also causes a cold hardening in the outer region of the helix, which adds to the fatigue strength and counteracts the wear of the force fit connecting element during the fitting.

The slug used in the production of the force fit connecting element may advantageously have a continuous shank diameter, which is the outer diameter for the helical profile as well as for the thread profile. This continuous shank diameter allows the formation of a force fit section as well as further sections, for instance with a fastening thread, in a way that the force fit section has the largest outer diameter with a corresponding overmeasure while, for example, the section with the fastening thread has an undermeasure with respect to the drilled hole. It is then possible to insert and force-fit the connecting element into the drilled hole of the corresponding part, in which the section with the fastening thread passes through the drilled hole with clearance, so that the drilled hole as well as the fastening thread are not damaged.

The helical profile may also have a larger core diameter than the core diameter of the section with the fastening thread. It is then ensured that the smallest diameter in any case is not in the region of the force fit section nor will a possible fracture occur in the region of the fastening thread.

The force fit section with the helical profile may have an overmeasure in the region of 0.3 to 0.7%, preferably approximately 0.5%, with respect to the nominal diameter of the drilled hole. In the state of the art with a ground force fit section a coverage in the order of 0.1–0.2% is used.

BRIEF DESCRIPTION OF THE DRAWINGS

The invention is further explained and described with the aid of preferred embodiments. The drawing shows.

DETAILED DESCRIPTION

Figure 1:
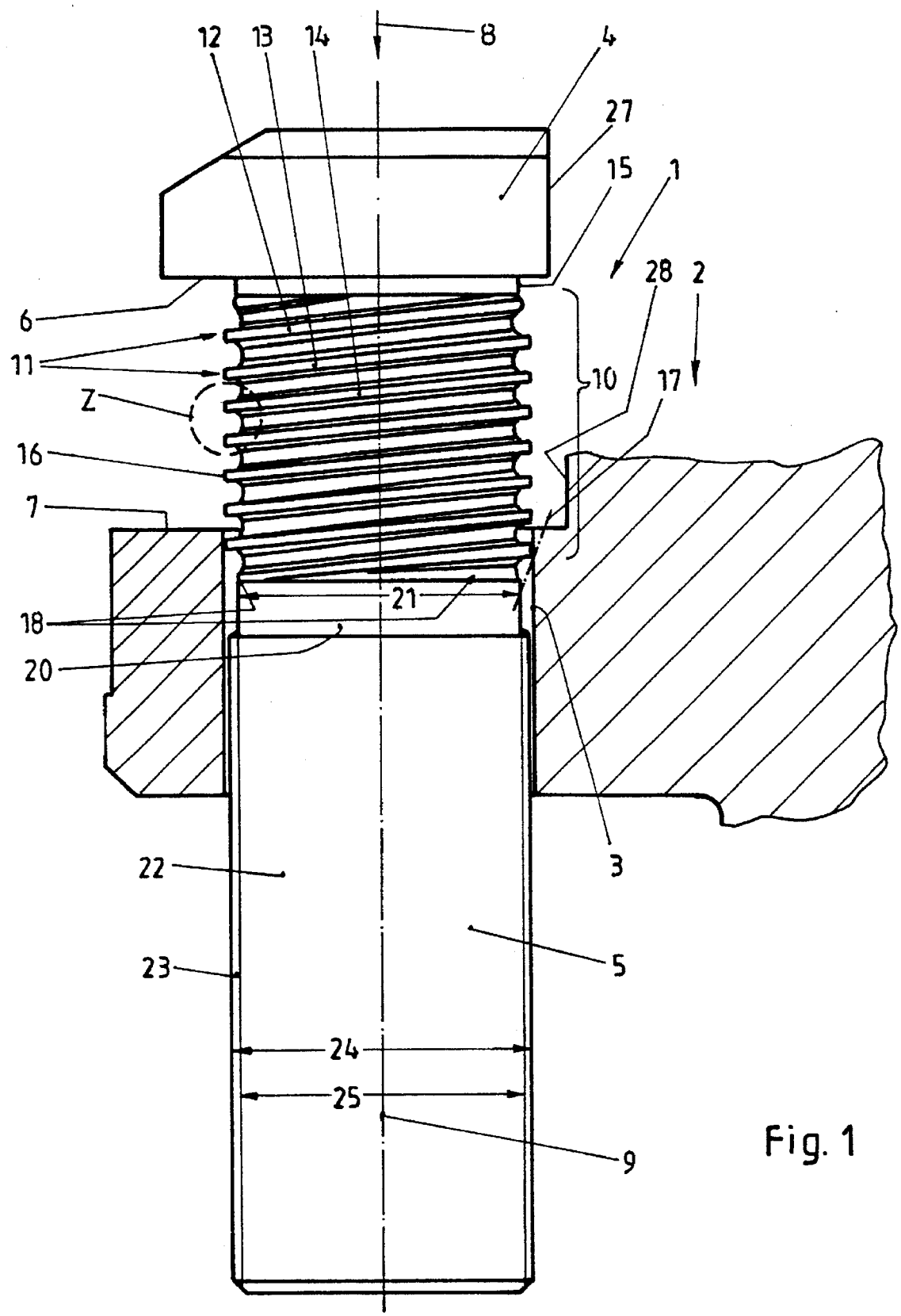
FIG. 1 is a first embodiment of the force fit connecting element as a wheel stud with a triple-threaded helical profile.

FIG. 1 shows the two parts which belong together, the force fit connecting element 1 and the corresponding part 2, into the drilled hole 3 of which the force fit connecting element 1 may be fitted by an axial force.

The force fit connecting element 1 has a stop 4 and a shank 5. The stop 4 is formed in the shape of a head and has the largest diameter of the force fit connecting element 1. The head-shaped stop 4 has a stop face 6 facing the shank 5, which comes to rest on an opposite face 7 of part 2 when the fitting by exertion of an axial force according to arrow 8 is finished. The stop 4 as well as the shank 5 are axially aligned with axis 9 of the force fit connecting element 1.

The shank 5 of the force fit connecting element 1 has on its side facing the stop 4 a force fit section 10, which is provided with a multiple-threaded helical profile 11. FIG. 1 shows a triple-threaded helical profile 11, in which the individual helixes 12, 13, and 14 are arranged with equal slopes and equally spaced on the circumference of the force fit section 10. The production of the helical profile 11 of the force fit section 10 is done by cold forming, so that in the region of the shank 5 a relief groove 15 on the side of the force fit section 10 facing the stop 4 is formed automatically during the cold forming from the corresponding diameter of the slug used. The outer diameter of the relief groove is therefore smaller than the maximum outer diameter 16 of the helix 12, 13, 14 of the force fit section 10. This has the advantage that the drilled hole 3 of the part 2, as shown in FIG. 1, does not need to be bevelled and the fitting is still correctly finished only when the stop face 6 comes into contact with the opposite face 7 of the part 2.

Figure 6:
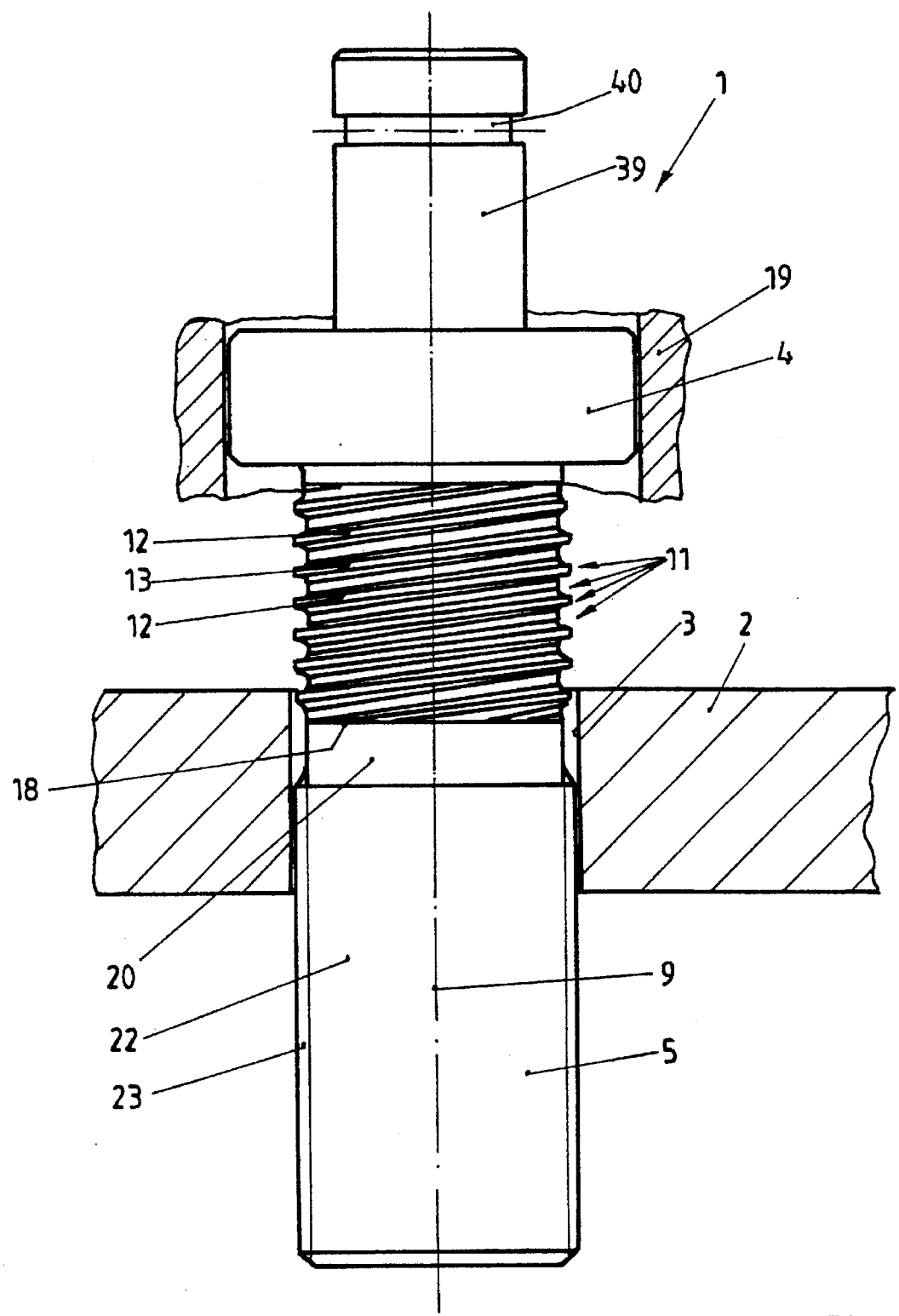
FIG. 6 is a fourth embodiment of the force fit connecting element with a double-threaded helical profile and a joining aid.

On the side facing away from the stop 4 a conical region 17 is likewise automatically made by the production of the helical profile 11 by cold forming, which is shown by the dot-dashed line. This conical region 17 is realized by the three endings of the helix 12, 13, and 14 on this side. The conical region 17 functions as a centering aid during the fitting of the force fit connecting element 1 into the part 2 at the beginning of the fitting process. Furthermore, three points 18, which are arranged equally spaced along the circumference and which define a plane that is exactly perpendicular to the axis 9 of the force fit connecting element 1, result from the three endings of the helix 12, 13, and 14 in conjunction with the dimensioning of the drilled hole 3. This leads to the circumstance that the force fit connecting element 1 is aligned with its axis 9 perpendicular to the fitting direction according to the arrow 8 during the fitting into the part 2. There is not only a centering, but additionally also an alignment. This alignment has the advantage that a seperate joining aid 19, as it is shown schematically in FIG. 6, is not needed. The force fit connecting element 1 itself is self-equipped with respect to providing a joining aid via the three points 18.

The shank 5 has in connection to the conical region 17 a transition region 20, which has a smaller outer diameter 21 than the outer diameter 16 of the helix 12, 13, and 14. The outer diameter 21 is the outer diameter of the shank 5 of the slug used.

In the direction of the free end of the shank 5 a section 22, which may be provided with a fastening thread 23, but which also may be journal-like or of different shape, is connected to the transition region 20. The maximum outer diameter 24 of the section 22 is in any case smaller than the maximum outer diameter 16 of the helical profile 11. The outer diameter 24 is also smaller than the inner diameter of the drilled hole 3 while the force fit section 10 has an overmeasure. The core diameter 25 of the fastening thread 23 may be smaller than the core diameter 26 of the helical profile 11.

The stop 4 may have a securing area 27, which corresponds to a securing area 28 on the part 2, so that a turning of the force fit connecting element 1 in the fitted state is prevented.

Figure 2:
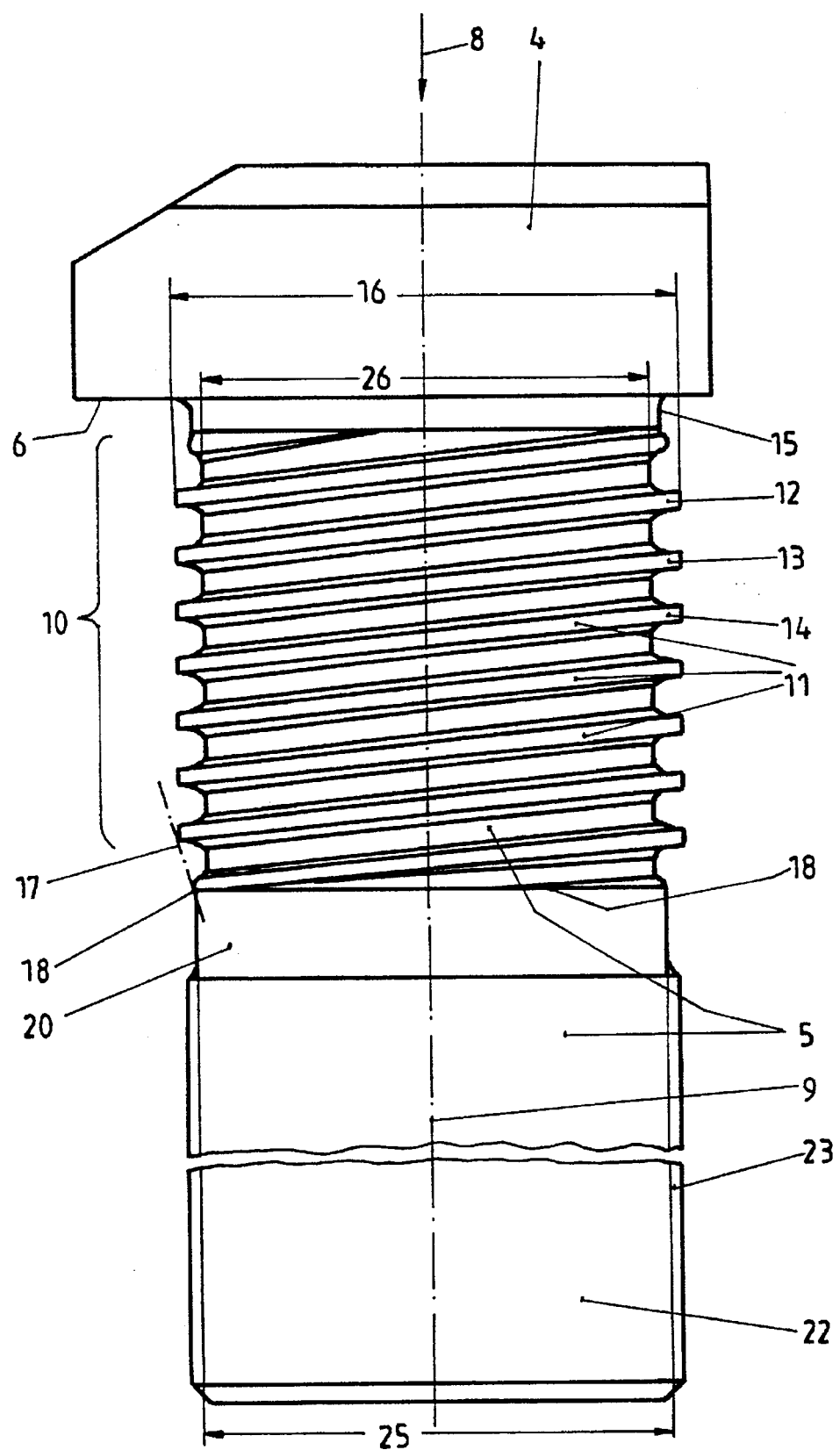
FIG. 2 is an enlarged representation of the force fit connecting element according to FIG. 1.

FIG. 2 again shows the force fit connecting element 1, in this case without the corresponding part 2.

Figure 3:
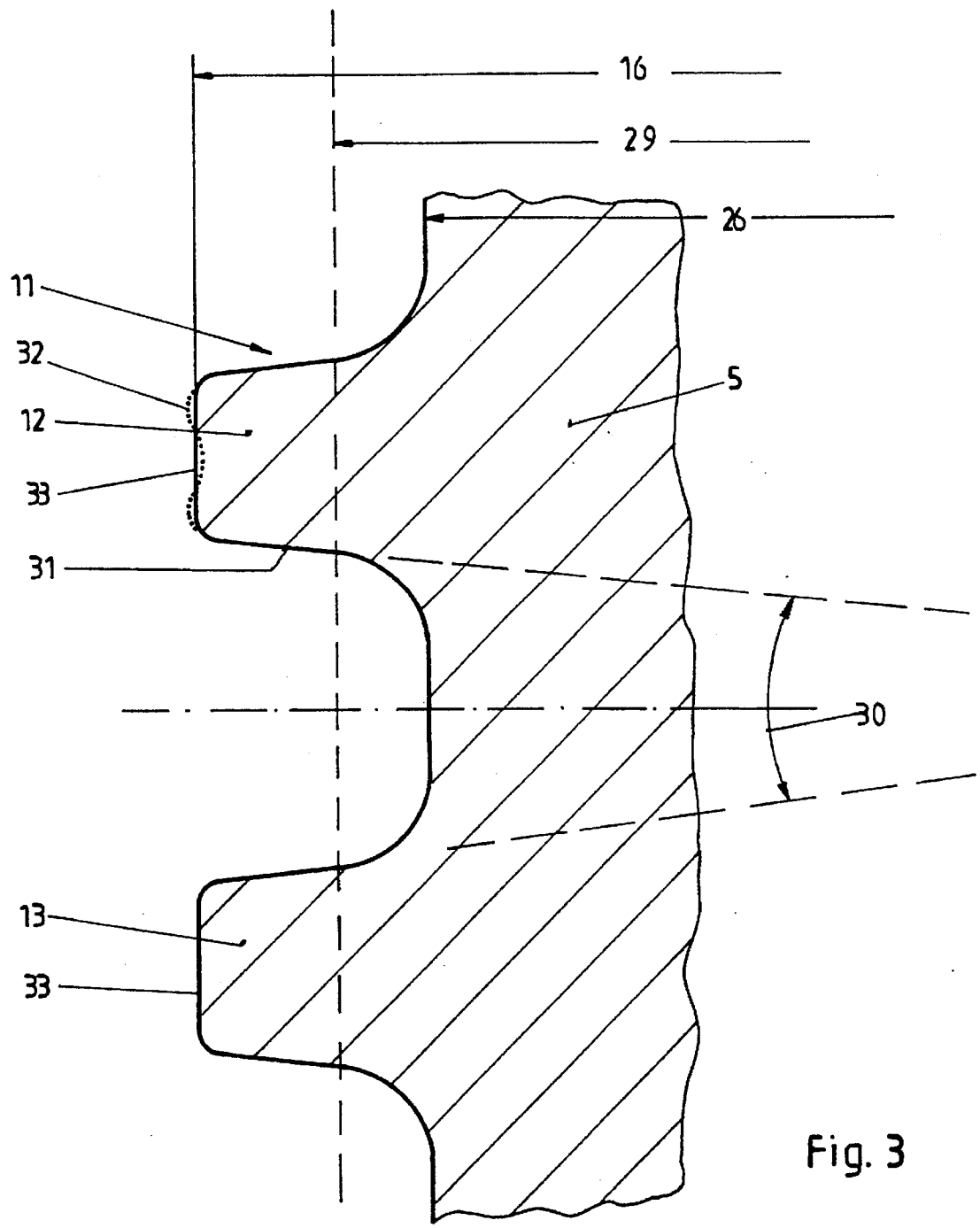
FIG. 3 is a section of the detail Z of the helical profile according to FIG. 1.

FIG. 3 shows the detail Z from FIG. 1, an example for the design of the helical profile 11 in the region of the force fit section 10. The helical profile 11 has the shape that can be seen in the drawing. The medium flank diameter 29 is at the same time the diameter of the slug, as it is used in the production of the force fit connecting element. The helical profile 11 is made by cold forming, in which a displacement of material, as can be seen, takes place from the inside to the outside. A flank angle 30 of 15° is realized here, which means that the flanks 31 take a relatively steep course. After the making of the helical profile 11 by cold forming the force fit section has a shape in the region of its outer diameter 16 that is shown for the helix 12 in FIG. 3 by the dotted line 32. This shape represents an intermediate work step. By cold forming, especially milling, rolling or butt-joining, the outer surface of the helical profile is smoothed, as is shown in FIG. 3 for the helix 13 in a solid line. The sum of the cylindrical area fractions with the outer diameter 16 of the helix 12, 13, 14 thus formed, related to a fictitious surface area of the force fit section 10 corresponding to the medium flank diameter 29, results in the contact area fraction 33, i.e. the fraction of the area of the force fit section 10 with the outer diameter 16 that comes into contact with the inner diameter of the drilled hole 3 when fitted into the part 2. This contact area fraction is at least 30%.

As a force fit connecting element 1, belonging to the drilled hole 3 of the part 2, the force fit section 10 always has overmeasure, where the new force fit connecting element has a larger coverage as compared to the state of the art. The coverage may be three times as much as in the state of the art. This is shown in the following comparison:

| State of the art with ground force fit section | |
| --- | --- |
| Outer diameter of the force fit section 22 U6 | max. outer diameter = 22.054 mm<br>min. outer diameter = 22.041 mm |
| Inner diameter of the drilled hole 22 H7 | max. inner diameter = 22.021 mm<br>min. inner diameter = 22.000 mm |

This results in a maximum coverage=22.054 mm−22.000 mm=0.054 mm minimum coverage=22.041 mm−22.021 mm=0.020 mm.

The overmeasure of the force fit section, the relative coverage, therefore is of the order of 0.16% with respect to the nominal diameter of the drilled hole.

| Object of the application with helical profile in the force fit section | |
| --- | --- |
| Outer diameter of the helical profile 22.11 mm | max. outer diameter = 22.130 mm<br>min. outer diameter = 22.110 mm |
| Inner diameter of the drilled hole 22 H7 | max. inner diameter = 22.021 mm<br>min. inner diameter = 22.000 mm |
| Maximum coverage = 22.130 mm − 22.000 mm = 0.130 mm | |
| Minimum coverage = 22.110 mm − 22.021 mm = 0.089 mm | |

The overmeasure of the helical profile with respect to the relative coverage is therefore of the order of 0.5% with respect to the nominal diameter of the drilled hole, it thus has approximately three times the coverage of the state of the art.

Figure 4:
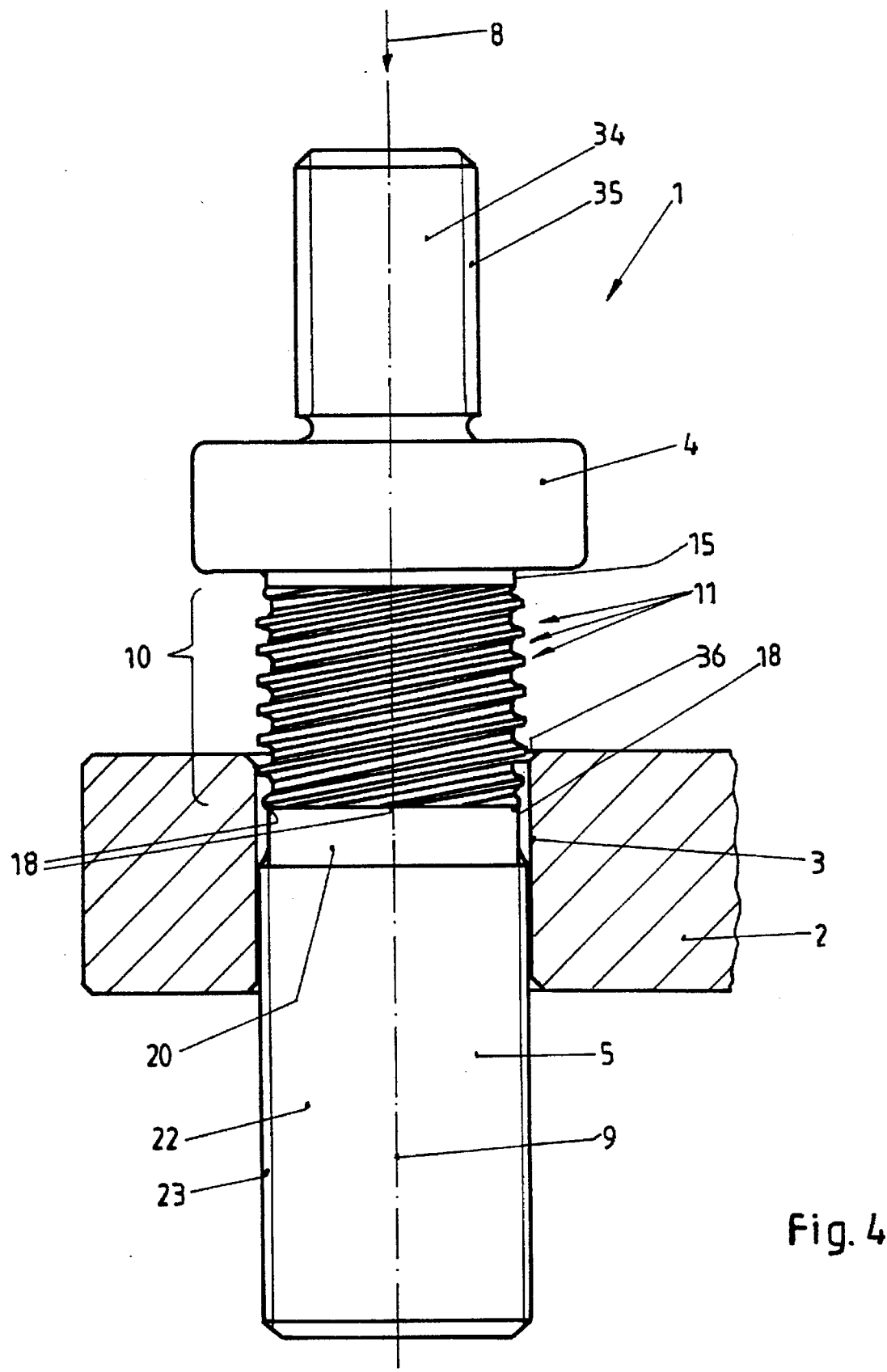
FIG. 4 is the force fit connecting element in a second embodiment with a quadruple-threaded helical profile.

FIG. 4 shows a second embodiment of the force fit connecting element 1, in which the stop 4 is realized by a center collar. Connected to the stop 4 on the side facing away from the shank 5 is a journal 34, which is provided with a thread 35. Here, too, the force fit connecting element 1 is fitted into the drilled hole 3 in the part 2 according to the arrow 8. The drilled hole 3 is provided with a bezel 36, which is not an obstruction. As already stated, bezel 36 is not necessary, however. The force fit section 10 here has a quadruple-threaded helical profile 11, so that during the fitting the plane perpendicular to the axis 9 is formed by four points 18.

Figure 5:
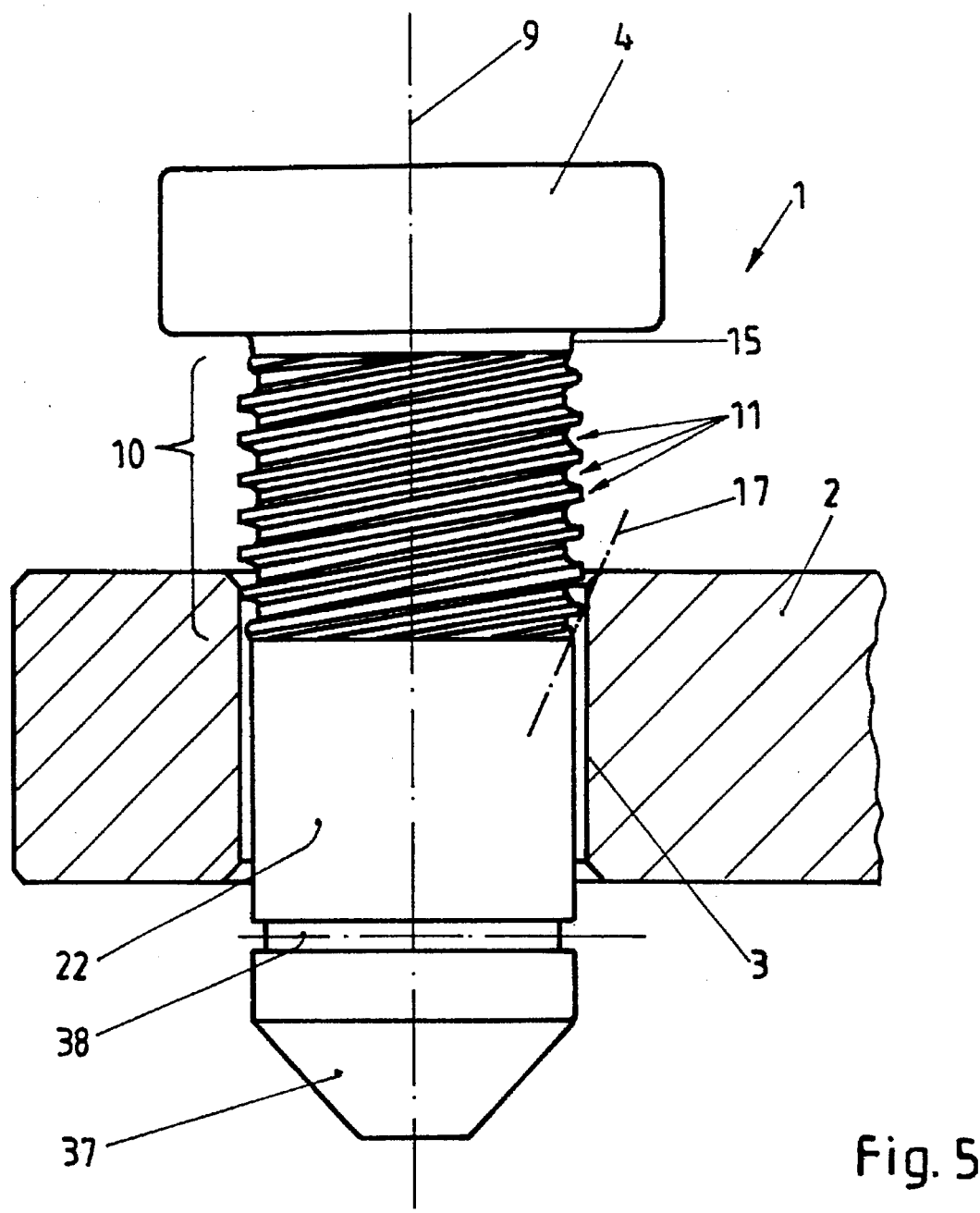
FIG. 5 is a third embodiment of the force fit connecting element with a quadruple-threaded helical profile.

The embodiment of the force fit connecting element 1 shown in FIG. 5 also has a quadruple-threaded helical profile 11. The section 22 is formed to be mostly cylindrical. It has a truncated conical tip 37 and a groove 38, which may serve to accept a retaining ring. This is an example of the force fit connecting element 1 in which no fastening thread 23 is provided in the region of the section 22. The transition region 20 is also missing in this case. Still, here too the conical region 17 is created by the ending of the helix, which has the centering and aligning functions.

FIG. 6 shows a fourth embodiment of the force fit connecting element 1 with a double-threaded helical profile 11, so that only two diagonally opposed points 18 are created at the inlet, which do not define a plane with respect to the axis 9. For this reason a joining aid 19 is necessary, in order to align the axis 9 of the force fit connecting element 1 to the drilled hole 3 of the part 2 during the fitting. A journal 39 with a groove 40 may be connected to the stop 4, which is fashioned as a center collar, at the side facing away from the shank 5. The design of this side of the stop 4 is not important for the present invention, neither is the design of the section 22, either with a fastening thread 23 or without one.

| LIST OF REFERENCE NUMERALS | |
| --- | --- |
| 1 | force fit connecting element |
| 2 | part |
| 3 | drill hole |
| 4 | stop |
| 5 | shank |
| 6 | stop face |
| 7 | opposite face |
| 8 | arrow |
| 9 | axis |
| 10 | force fit section |
| 11 | helical profile |
| 12 | helix |
| 13 | helix |
| 14 | helix |
| 15 | relief groove |
| 16 | outer diameter |
| 17 | conical region |
| 18 | point |
| 19 | joining aid |
| 20 | transition region |
| 21 | outer diameter |
| 22 | section |
| 23 | fastening thread |
| 24 | outer diameter |
| 25 | core diameter |
| 26 | core diameter |
| 27 | securing area |
| 28 | securing area |
| 29 | flank diameter |
| 30 | flank angle |
| 31 | flank |
| 32 | line |
| 33 | contact area fraction |
| 34 | journal |
| 35 | thread |
| 36 | bezel |
| 37 | tip |
| 38 | groove |
| 39 | journal |
| 40 | groove |

While the foregoing specification and drawings set forth preferred embodiments of the invention, it will be understood by those skilled in the art that variations and modifications thereof can be made without departing from the spirit and scope of the invention, as set forth in the following claims.

We claim:

1. A removable and reusable force fit connector comprising:

a corresponding part of a first material having a drilled hole, said drilled hole having an open ended and generally cylindrical surface extending along the circumference of said drilled hole through the corresponding part;

a force fit connecting element of a second material of a greater strength than said first material for being axially forced into said drilled hole, said connecting element including an elongated and generally cylindrical shank formed about a longitudinal axis, said shank having a breadth, a first end, and an opposed second end;

a stop formed at the first end of said shank, said stop having a breadth greater than the breadth of said shank;

a threaded section formed on said shank adjacent said second end thereof, said threaded section having at least one helical thread defined thereon, said at least one helical thread having an outer thread diameter sized smaller than the diameter of said drilled hole;

a force fit section formed on said shank intermediate said stop and said threaded section, said force fit section including at least three generally non-deformable threads sized and shaped to align said shank within said drilled hole, each of said at least three threads having a generally helical profile and an oversized outer diameter sized greater than the diameter of said drilled hole, each of said at least three threads being sized and shaped to elastically deform the cylindrical surface of said drilled hole engaged by said at least three threads, as said connecting element is axially forced into said drilled hole;

said threads of said force fit section including a conical region tapered inwardly toward said threaded section for centering said connecting element in the hole of said corresponding part;

said shank including a transition region between said conical region and said threaded section of smaller breadth than the breadth of said force fit section;

each of said at least three threads of said force fit section forming a contact area with at least a portion of the cylindrical surface of said drilled hole, said contact area having a contact area fraction between the portions of said at least three threads engaged with the cylindrical surface of said drilled hole with respect to the total cylindrical surface of the drilled hole of at least thirty per-cent.

2. The force fit connecting element of claim 1, wherein said helical profile of each of said at least three threads of the force fit section is formed on said shank by cold forming.

3. The force fit connecting element of claim 1, wherein said oversized outer diameter of each of said at least three threads is formed by a gauging operation, said operation being selected from one of the group of operations consisting of milling, cold rolling, and butt-joining.

4. The force fit connecting element of claim 1, wherein said helical profiles of each of said at least three threads has a flank angle in the range of from zero degrees to thirty degrees.

5. The force fit connecting element of claim 1, wherein said helical profiles of each of said at least three threads has a flank angle of fifteen degrees.

6. The force fit connecting element of claim 1, wherein said shank has a continuous core diameter extending along the length of said shank, said core diameter being constant for both said force fit section and said threaded section.

7. The force fit connecting element of claim 1, wherein said force fit section has a first core diameter and said threaded section has a second core diameter, and wherein said first core diameter is sized larger than said second core diameter.

8. The force fit connecting element of claim 1, wherein said oversized outer diameter of said at least three threads is sized in the range of from 0.3% to 0.7% larger than the diameter of said drilled hole.

9. The force fit connecting element of claim 8, wherein said oversized outer diameter is sized to be approximately 0.5% larger than the diameter of the drilled hole.

10. The force fit connecting element of claim 1, wherein said at least three threads terminate in a common plane perpendicular with respect to the length of said shank.

11. The force fit connecting element of claim 10, wherein said at least three threads of said force fit section terminate at evenly spaced points with respect to each other on said plane.

12. The force fit connecting element of claim 11, wherein said force fit section is sized and shaped to be self aligning with respect to said drilled hole in the corresponding part as said connecting element is axially forced into the drilled hole.

13. The force fit connecting element of claim 12, and wherein said conical region is formed about said shank by the termination of said at least three threads with respect to the shank.

14. A removable and reusable force fit connector, said connector comprising:

a corresponding part of a first material;

a generally circular drilled hole defined in said corresponding part and extending therethrough, said drilled hole having a diameter and defining an open ended, generally cylindrical surface extending along the circumference of said drilled hole;

a force fit connecting element of a second material of a greater strength than said first material for being force fit within said drilled hole by an axial force applied to the connecting element, said connecting element having an elongated and generally cylindrical shank formed about a longitudinal axis, said shank having a breadth, a first end, and an opposed second end;

a stop formed at the first end of the shank, said stop having a breadth greater than the breadth of the shank;

a threaded section formed on the shank adjacent said second end of the shank, said threaded section having at least one helical thread defined thereon, said at least one helical thread having an outer thread diameter sized smaller than the diameter of said drilled hole;

a force fit section formed on said shank intermediate said stop and said threaded section, said force fit section having at least three generally non-deformable threads, each of said at least three threads being constructed and arranged to generally align the longitudinal axis of said shank with respect to said drilled hole, each of said at least three threads having a generally helical thread profile and an oversized outer diameter sized greater than the diameter of said drilled hole, each of said at least three threads being sized and shaped to elastically deform the cylindrical surface of said drilled hole engaged by each of said at least three threads, respectively, as said connecting element is axially forced into said drilled hole;

the threads of said force fit section including a conical region tapered inwardly toward said threaded section for centering said connecting element in the hole of said corresponding part;

said at least three threads forming a contact area with at least a portion of the cylindrical surface of the drilled hole, said contact area having a contact area fraction between the portions of said at least three section threads engaged on the cylindrical surface of the drilled hole with respect to the total surface of the cylindrical area of the drilled hole of at least thirty per-cent.

15. In a force fit connector having a connecting element of a first material and a corresponding part of a second material of less strength than said first material in which the connecting element is force fit, the connecting element having an elongated and generally cylindrical shank, the shank having a breadth and being formed about a longitudinal axis, the shank also having a first end and an opposed second end, a stop formed at the first end of the shank of a breadth greater than the breadth of the shank, and a threaded section formed on the shank adjacent the second end of the shank, the connecting element being force fit in the corresponding part by an axial force applied to the connecting element, the improvement comprising:

- a drilled hole defined in and extending through the connecting part for passing the connecting element therethrough, the drilled hole having a diameter and defining an open ended, generally cylindrical surface extending along the circumference of the drilled hole through the corresponding part,
- a force fit section formed on the shank intermediate the stop and the threaded section thereof;
- said force fit section including at least three threads, each of said at least three threads having a generally helical thread profile and an oversized outer diameter sized greater than the diameter of said drilled hole, each of said at least three threads being sized and shaped to elastically deform the cylindrical surface of said drilled hole engaged by said at least three threads, as said force fit section of the connecting element is axially forced into said drilled hole; and
- the threads of said force fit section including a conical region tapered inwardly toward said threaded section for centering said connecting element in the hole of said corresponding part;
- said shank including a transitional region between said conical region and said threaded section of smaller breadth than the breadth of said force fit section;
- wherein said at least three threads form a contact area with at least a portion of the cylindrical surface of the drilled hole, said contact area having a contact area fraction between the portions of said at least three threads engaged on the cylindrical surface of the drilled hole with respect to the total surface of the cylindrical area of the drilled hole of at least thirty per-cent.

\* \* \* \* \*